Jan. 6, 1925.

C. LAMBRIGHT

BRAKE

Filed Feb. 18, 1924

1,521,957

Charles Lambright
INVENTOR

BY Victor J. Evans
ATTORNEY

WITNESS:

Patented Jan. 6, 1925.

1,521,957

UNITED STATES PATENT OFFICE.

CHARLES LAMBRIGHT, OF YORK, PENNSYLVANIA.

BRAKE.

Application filed February 18, 1924. Serial No. 693,722.

*To all whom it may concern:*

Be it known that I, CHARLES LAMBRIGHT, a citizen of the United States, residing at York, in the county of York and State of Pennsylvania, have invented new and useful Improvements in Brakes, of which the following is a specification.

This invention relates to brakes for automobiles and has for an object the provision of a brake which is particularly adapted for use upon the front or steering wheels of an automobile, whereby all of the wheels of an automobile may be equipped with brakes.

Another object of the invention is the provision of a front wheel brake which may be operated when the automobile is traveling straight ahead or making a turn and in which the brake shoes are normally retracted in the same direction as the direction of rotation of the wheels when the vehicle is moving forward so as to overcome any tendency of the brakes being accidentally applied and locked due to the brake drum engaging the brake shoe and pulling the latter into a braking position.

Another object of the invention is the provision of a brake mechanism of the character above noted which is simple in construction, positive in operation and which will not rattle or chatter.

With the above and other objects in view, the invention further includes the following novel features and details of construction, to be hereinafter more fully described, illustrated in the accompanying drawings and pointed out in the appended claims.

In the drawings:—

Figure 1:
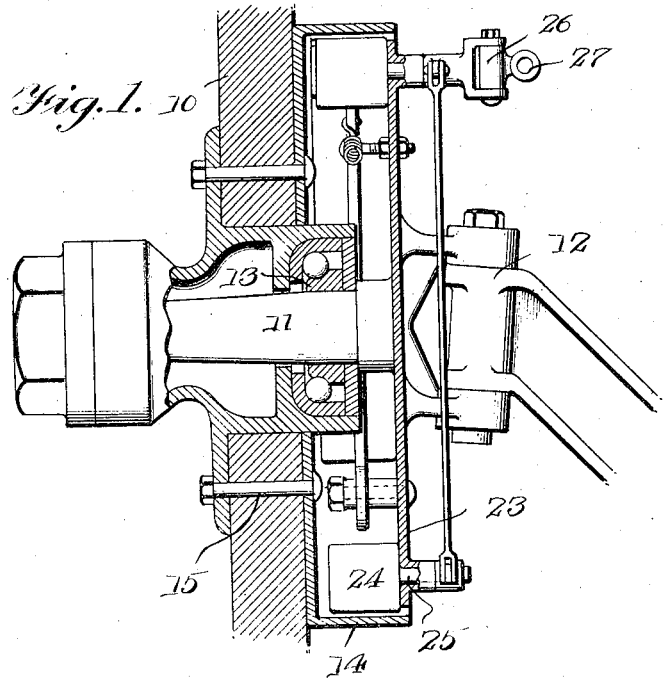
Figure 1 is a fragmentary section taken diametrically of the front wheel of an automobile with the improved brake applied.

Referring to the drawings in detail wherein like characters of reference denote corresponding parts, the reference character 10 indicates a portion of the front wheel of an automobile, 11 the spindle, 12 the steering knuckle and 13 the bearing.

The improved brake comprises a brake drum 14 which is secured to the wheel by bolts or like fastening devices 15 so as to rotate with the wheel. Pivotally secured within the drum as shown at 16 are brake shoes 17, the latter being provided with brake linings 18 to engage the inner periphery of the drum 14.

The brake shoes 17 are of arcuate shape and their pivoted ends are curved substantially as shown at 19 so that when the shoes are moved upon their pivots they will travel in a radial direction with respect to the spindle 11 so that the entire braking surface of the shoes will simultaneously engage the drum. The shoes are slotted as shown at 20 and extending through these slots are guide screws or pins 21. These guide screws not only serve as a guide for the shoes, but act to prevent objectionable rattling. The shoes are normally urged inward or toward the spindle 11 by means of springs 22.

Secured to the spindle 11 is a relatively stationary member or plate 23 which is adapted to close one end of the drum 14 and provide a housing for the brake shoes and the shoe operating members. These members are in the form of dogs 24 which are pivotally mounted upon studs or shanks 25 having bearings in the plate 23. One of these studs or shanks has secured thereto a knuckle 26 which carries one member 27 (for example, a socket) of a universal joint, whereby this dog may be operatively connected to a suitable brake operating means. The universal joint permits of the dog being rocked pivotally and of the brake being operated irrespective of the position of the wheel 10. In order to provide for the simultaneous operation of both of the shoes 17, the shanks or studs 25 have connected thereto crank arms 28 and the latter are in turn connected by a rod 29.

Figure 2:
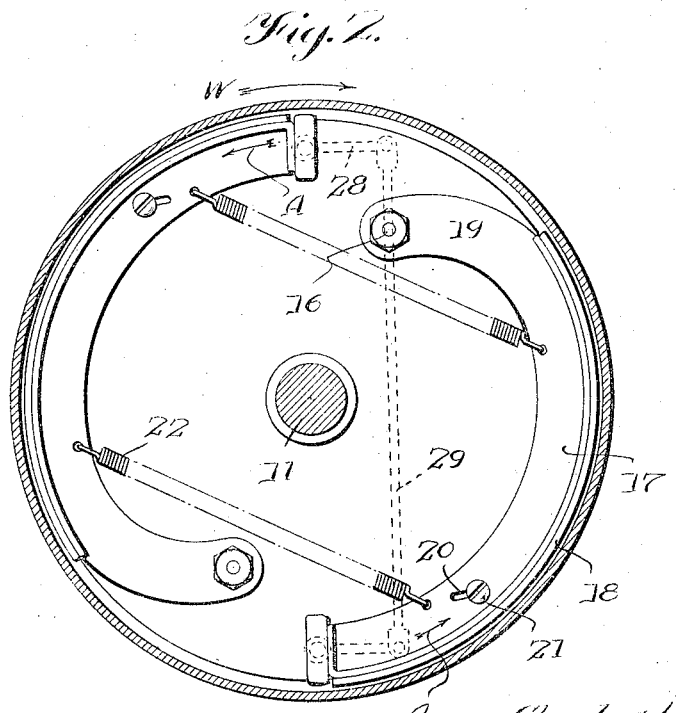
Figure 2 is a section at right angles to Figure 1.

From the foregoing description and accompanying drawings it will be seen that when the dogs are moved pivotally, they will both move in the same direction, one dog engaging one end of each of the shoes 17 so as to move the shoes in the direction of the arrow A shown in Figure 2 and thereby force the shoes outward into braking engagement with the drum. This direction of movement is opposite the direction of rotation of the wheel, the latter being indicated by the arrow W shown in Figure 2. Thus, the tendency will be to force the brakes inward or into disengaged position when the wheel is traveling forward so that accidental locking of the brakes due to accidental engagement between the drum and shoes will be prevented.

The invention is susceptible of various changes in its form, proportions and minor details of construction and the right is herein reserved to make such changes as properly fall within the scope of the appended claim.

Having described the invention what is claimed is:—

An automobile brake comprising in combination with a wheel, a brake drum secured thereto, a relatively stationary plate closing one end of the drum and providing a housing, brake shoes within the housing, each of said shoes having an inwardly curved end pivotally secured to the plate at a point appreciably spaced from the inner periphery of the drum, whereby the entire braking surface of the shoe will evenly engage the drum, dogs pivotally mounted within the housing at points spaced from the pivotal securing means of the shoes, said dogs engaging the other ends of the shoes for moving the latter pivotally to engage the drum, means whereby an operating member may be connected to the dogs to provide for simultaneous movement, means for yieldingly holding the shoes in disengaged position and combined guiding and anti-rattling means connecting the shoes and housing.

In testimony whereof I affix my signature.

CHARLES LAMBRIGHT.